US009392481B2

(12) United States Patent
Sun et al.

(10) Patent No.: US 9,392,481 B2
(45) Date of Patent: Jul. 12, 2016

(54) SYSTEM AND METHOD FOR BUFFER STATUS REPORTING FOR MULTI-STREAM AGGREGATION

(71) Applicant: FutureWei Technologies, Inc., Plano, TX (US)

(72) Inventors: Yishen Sun, Buffalo Grove, IL (US); Hao Bi, Lake Zurich, IL (US)

(73) Assignee: Futurewei Technologies, Inc., Plano, TX (US)

( * ) Notice: Subject to any disclaimer, the term of this patent is extended or adjusted under 35 U.S.C. 154(b) by 115 days.

(21) Appl. No.: 14/216,619

(22) Filed: Mar. 17, 2014

(65) Prior Publication Data

US 2014/0269352 A1 Sep. 18, 2014

Related U.S. Application Data

(60) Provisional application No. 61/793,793, filed on Mar. 15, 2013.

(51) Int. Cl.

*H04W 24/10* (2009.01)
*H04W 72/04* (2009.01)
*H04W 72/12* (2009.01)

(52) U.S. Cl.

CPC ............ *H04W 24/10* (2013.01); *H04W 72/042* (2013.01); *H04W 72/1284* (2013.01)

(58) Field of Classification Search

None

See application file for complete search history.

(56) References Cited

U.S. PATENT DOCUMENTS

2009/0303954 A1* 12/2009 Guo ........................ H04L 47/14 370/329
2010/0302946 A1 12/2010 Yang et al.

(Continued)

FOREIGN PATENT DOCUMENTS

CN 101925128 A 12/2010
CN 102111751 A 6/2011

OTHER PUBLICATIONS

LTE, “3rd Generation Partnership Project; Technical Specification Group Radio Access Network; Evolved Universal Terrestrial Radio Access (E-UTRA); Medium Access Control (MAC) Protocol Specification (Release 11),” 3GPP TS 36.321 v11.0.0, Sep. 2012, 55 pages.

(Continued)

*Primary Examiner* — Benjamin H Elliott, IV
*Assistant Examiner* — Eric Nowlin
(74) *Attorney, Agent, or Firm* — Slater Matsil, LLP

(57) ABSTRACT

Embodiments are provided herein for enabling buffer status reporting for Multi-stream aggregation (MSA) in wireless networks. In an embodiment, a user equipment (UE) receives from a network, a configuration regarding one of enabling and disabling cross-node buffer status reporting. The UE further receives a first uplink grant from a first network node, and obtains a buffer status intended for a second network node. Upon enabling cross-node buffer status reporting according to the configuration, the UE transmits, in the first uplink grant to the first network node, the buffer status intended for the second network node. The first network node receives, from the UE, the buffer status intended for the second network node, and determines whether to forward the buffer status to the second network node according to the configuration regarding buffer status forwarding previously received at the first network node.

25 Claims, 10 Drawing Sheets

110
F2 CAPACITY LAYER
112
120
112
112
120
F1 COVERAGE LAYER
F2 CAPACITY LAYER
F2 CAPACITY LAYER

(56) References Cited

U.S. PATENT DOCUMENTS

2011/0205975 A1* 8/2011 Umesh .............. H04W 72/1284 370/329
2011/0232972 A1* 9/2011 McQueen .......... G01G 19/4144 177/1
2011/0242972 A1 10/2011 Sebire et al.
2012/0149298 A1* 6/2012 Jiang ................. H04W 72/1252 455/7
2012/0250605 A1* 10/2012 Du .......................... H04L 47/14 370/315
2013/0094455 A1* 4/2013 Wu ....................... H04W 24/02 370/329

OTHER PUBLICATIONS

Chinese Application "A Method of Scheduling Data in the inter-eNB CA," Huawei 832675324, date unknown, 23 pages.
International Search Report received in Application No. PCT/US2014/030678, mailed Aug. 25, 2014, 9 pages.
Pradap et al., "Uplink Buffer Status Reporting for Delay Constrained Flows in 3GPP Long Term Evolution," IEEE Communications and Networking Conference 2009, Apr. 5-8, 2009, 9 pages.

* cited by examiner

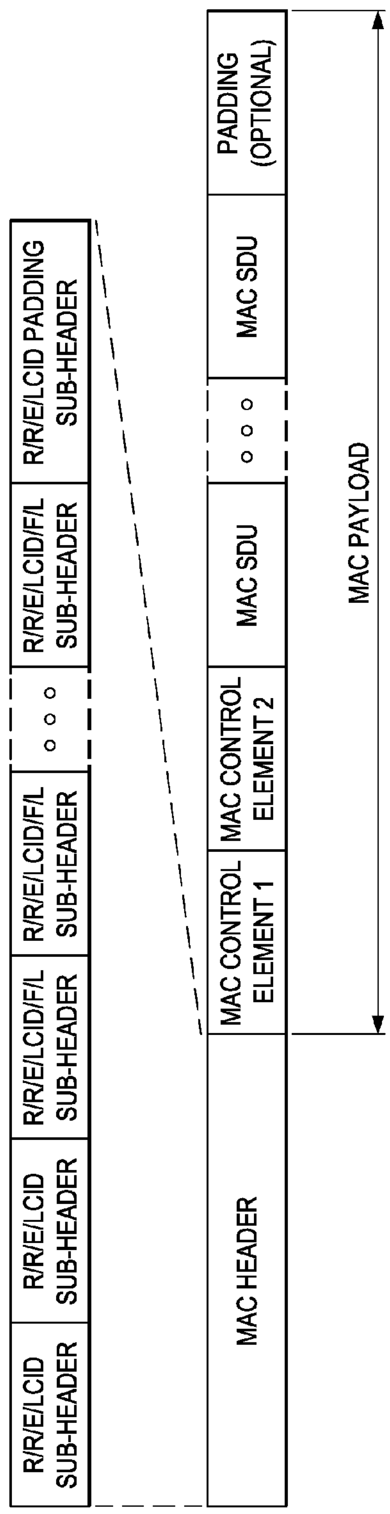
FIG. 2
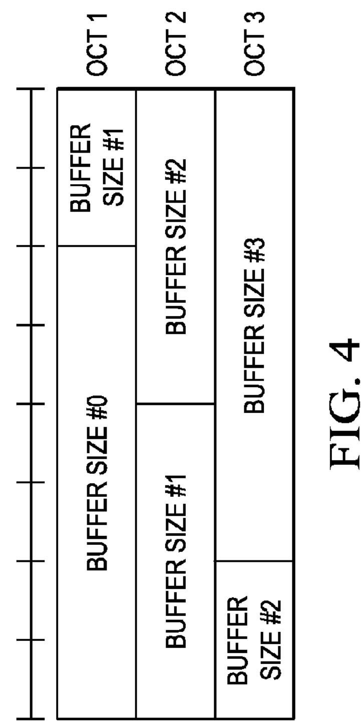
FIG. 4
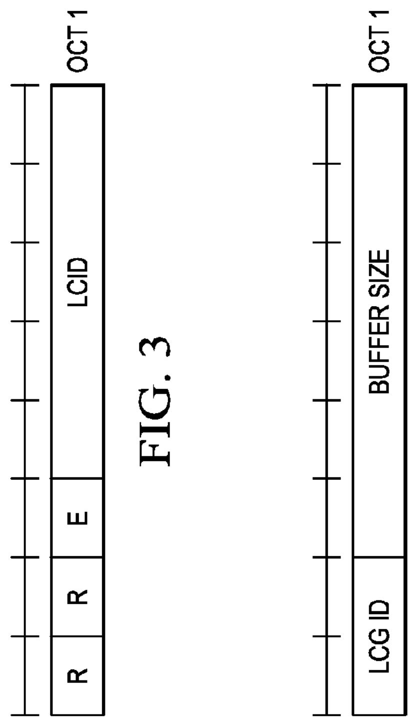
FIG. 3
FIG. 5

SYSTEM AND METHOD FOR BUFFER STATUS REPORTING FOR MULTI-STREAM AGGREGATION

This application claims the benefit of U.S. Provisional Application No. 61/793,793 filed on Mar. 15, 2013 by Yishen Sun et al. and entitled "System and Method for Buffer Status Reporting for Multi-Stream Aggregation," which is hereby incorporated herein by reference as if reproduced in its entirety.

TECHNICAL FIELD

The present invention relates to the field of wireless communications, and, in particular embodiments, to a system and method for buffer status reporting for multi-stream aggregation.

BACKGROUND

Multi-stream aggregation (MSA) is a technology proposed for the Long Term Evolution-Advanced (LTE-A) standard. MSA sometimes may be referred to as Dual Connectivity in 3GPP technical documents as well. MSA may be used to refer to operation where a given user equipment (UE) consumes radio resources provided by at least two different network points connected with ideal or non-ideal backhaul. Furthermore, each eNodeB (eNB) involved in MSA for a UE may assume different roles. Those roles do not necessarily depend on the eNB's power class and can vary among UEs. MSA is capable of increasing user equipment (UE) data rates, such as at a cell edge. The benefits of MSA are achieved by throughput aggregation from multiple nodes and efficient multi-layer operations. The multiple nodes throughput aggregation technique of MSA works under intra-site and fast backhaul scenarios, and further supports backhauls with limited bandwidth and higher latency. A buffer status reporting procedure can be used to provide the serving eNodeB (eNB) with information about the amount of data available for transmission in the uplink (UL) buffers of the UE over the uplink between the UE and the serving eNB. There is a need for an efficient mechanism to report the buffer status for MSA.

SUMMARY OF THE INVENTION

In accordance with an embodiment, a method performed by a user equipment (UE) for buffer status reporting for multi-stream aggregation (MSA) includes receiving, from a network, a configuration regarding one of enabling and disabling cross-node buffer status reporting, and receiving a first uplink allocation from a first network node. The method further includes obtaining a buffer status intended for a second network node. Upon enabling cross-node buffer status reporting according to the configuration, the UE transmits, in the first uplink allocation to the first network node, the buffer status intended for the second network node.

In accordance with another embodiment, a method performed by a network node for buffer status reporting for MSA includes receiving a configuration regarding cross-buffer status reporting from the network node to another network node, and receiving, from a UE, a buffer status intended for a second network node. The cross-node buffer status reporting is enabled at the UE. The network node then determines whether to forward the buffer status to the second network node according to the configuration regarding cross-buffer status reporting.

In accordance with another embodiment, a UE supporting buffer status reporting for MSA comprises at least one processor and a non-transitory computer readable storage medium storing programming for execution by the at least one processor. The programming includes instructions to receive, from a network, a configuration regarding one of enabling and disabling cross-node buffer status reporting transmission, receive a first uplink allocation from a first network node, and obtain a buffer status intended for a second network node. According to the instructions, upon enabling cross-node buffer status reporting according to the configuration, the UE transmits, in the first uplink allocation to the first network node, the buffer status intended for the second network node.

In accordance with yet another embodiment, a network node supporting for buffer status reporting for MSA comprises at least one processor and a non-transitory computer readable storage medium storing programming for execution by the at least one processor. The programming includes instructions to receive a configuration regarding cross-buffer status forwarding from the network node to another network node, and receive, from a UE, a buffer status intended for a second network node. The cross-node buffer status reporting is enabled at the UE. The instructions further configure the network node to determine whether to forward the buffer status to the second network node according to the configuration regarding cross-buffer status forwarding.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 2 illustrates an example of a medium access control (MAC) protocol data unit (PDU);

FIG. 3 illustrates a buffer status report (BSR) control element (CE) subheader;

FIG. 4 illustrates a BSR CE payload for a long BSR;

FIG. 5 illustrates a BSR CE payload for a short BSR or truncated BSR;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
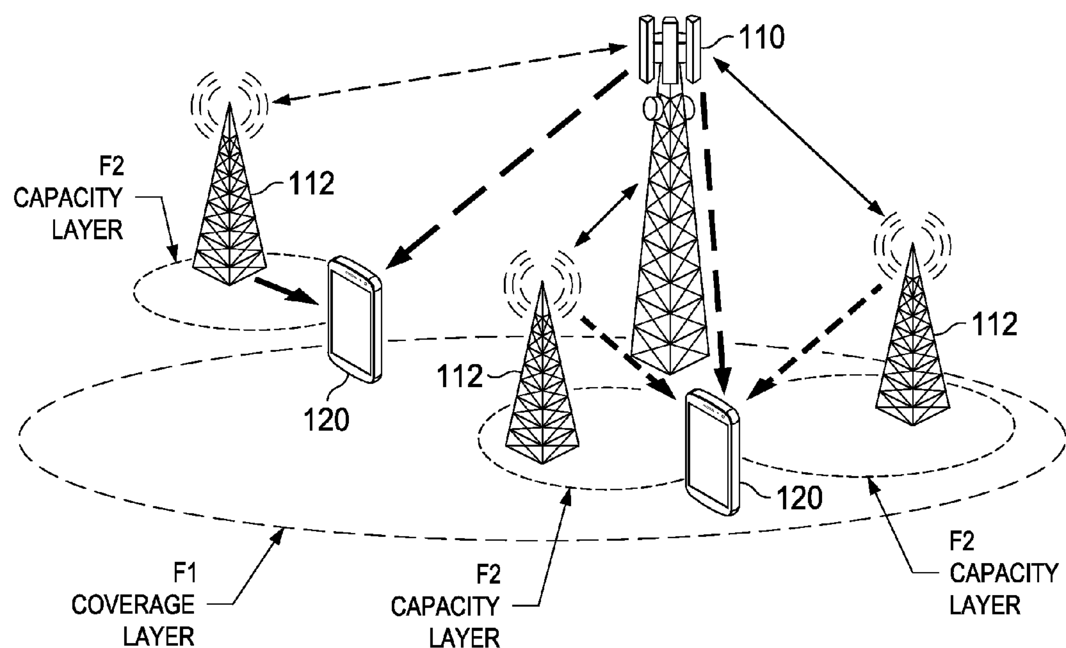
FIG. 1 illustrates multi-stream aggregation (MSA) in a wireless network.

FIG. 1 shows MSA in a wireless network, such as for LTE systems. The network comprises a plurality of network nodes 110 and 112, e.g., including eNBs. MSA is used for increasing UE data rates, such as for UEs 120 at the cell edges. The benefits of MSA are achieved by throughput aggregation from multiple nodes and efficient multi-layer operations. Compared to existing Rel-11 coordinated multi-point communication (CoMP) and carrier aggregation (CA) solutions, the multiple nodes throughput aggregation technique of MSA not only works under intra-site and fast backhaul scenarios, but also supports backhauls with limited bandwidth and/or higher latency. MSA also supports both intra-frequency and inter-frequency operations. The multi-layer operation of MSA can enhance the heterogeneous network (Hetnet) performance. In this case, the efficient coordinated multi-point protocol stack enables a coverage layer with the macro-node 110 to handle mobility and traffic steering, and a capacity layer with low power nodes (LPNs) 112 to ensure high data rate. The cluster of LPNs 112 allows energy-efficient topology adaptation according to traffic load variation.

Additionally, a buffer status reporting procedure is used in LTE to provide a serving node, e.g., 112, with information about the amount of data available for transmission in an UL buffer of the UE 120 over the UL between the UE 120 and the serving node 112. A BSR is sent as a medium access control (MAC) control element (CE) to the corresponding serving node 112. Based on the event which triggers a BSR, the BSR can be categorized as a regular BSR, periodic BSR, or padding BSR. A regular BSR is triggered by, for example, the UL data arrival for a logical channel, either with higher priority or an empty buffer. Alternatively, the BSR can be triggered for retransmission. A BSR can also be categorized according to the format, such as a long BSR, short BSR, or truncated BSR. Regardless of the BSR category, according to the specification of the current LTE/LTE-A system, the content of the BSR which is sent to the serving node, e.g., 112, only reflects the amount of data that will to be transmitted in UL grants assigned by that specific serving node e.g., 112, in the future, and does not reflect any data that will to be transmitted in UL grants assigned by any other serving node, e.g., 110, in the future.

FIG. 2 shows a MAC PDU. A MAC PDU contains a MAC header. The MAC PDU may also include zero or more MAC service data units (SDUs), zero or more MAC CEs, and optionally padding. A MAC PDU header contains one or more MAC PDU subheaders, where each subheader corresponds to either a MAC SDU, a MAC CE, or padding in the MAC PDU. Both the MAC header and the MAC SDUs may be of variable sizes. The subheaders for fixed sized MAC CEs comprise four header fields: R/R/E/LCID. The fields R represent reserved bit, and the filed E represents an extension field. The logical channel identifier (LCID) indicates the logical channel instance of the corresponding MAC SDU or the type of the corresponding MAC control element or padding. There is one LCID field for each MAC SDU, MAC control element or padding included in the MAC PDU. The MAC PDU subheaders have the same order in the MAC PDU header as the corresponding MAC SDUs, MAC CEs and padding in the MAC PDU payload section (subsequent to the MAC PDU header).

FIG. 3 shows a BSR CE subheader, which can be one of the MAC PDU subheaders (in the MAC PDU header). The BSR CE subheader (also referred to herein as a BSR subheader) indicates the format/type of a corresponding BSR CE payload in the MAC PDU payload section. Each BSR subheader in the MAC PDU header comprises a LCID of a predetermined value, indicating a specific BSR format. For instance, the LCID is set to 11110 for a long BSR, set to 11101 for a short BSR, and set to 11100 for a truncated BSR.

FIG. 4 shows a BSR CE payload for a long BSR. The payload of the long BSR format contains four buffer size fields, corresponding to Logical Channel Group (LCG) IDs: 0 to 3. FIG. 5 shows a BSR CE payload for a short BSR or truncated BSR. The payload of the short BSR and truncated BSR formats contains one LCG ID field and one corresponding buffer size field.

Figure 6:
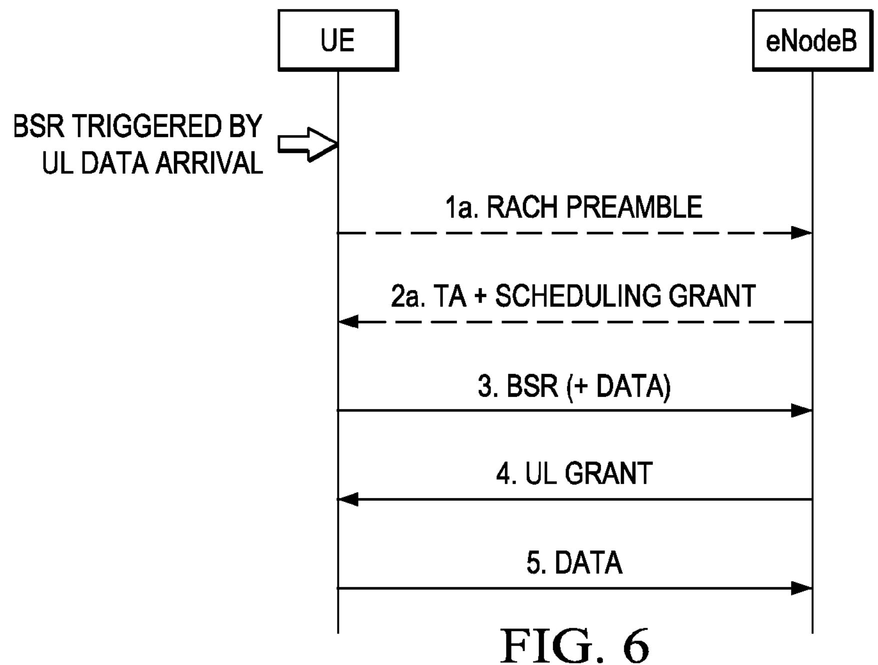
FIG. 6 illustrates an example of a buffer status reporting procedure when a UE is in 'non-synchronized' state or there is no SR opportunity for the UE, assuming no collision occurs during the RACH procedure.

FIG. 6 shows an example of a buffer status reporting procedure, when a UE is in 'non-synchronized' state or there is no scheduling request (SR) opportunity. After the BSR is triggered by UL data arrival, the UE will send a random access (RACH) preamble to the eNB as shown in step 1*a*. In return, at step 2*a*, the UE receives a timing advance (TA) and a scheduling grant (or allocation) from the eNB. At step 3, the UE sends a BSR to the eNB, and maybe some data if there is any resource available in the MAC PDU after including the BSR. At step 4, the UE receives an UL grant from the eNB. At step 5, the UE sends data to the eNB. The steps 1 and 2 are part of a RACH procedure, and are used when a UE is "non-synchronized" or there are no physical uplink control channel (PUCCH) resources for SR available.

Figure 7:
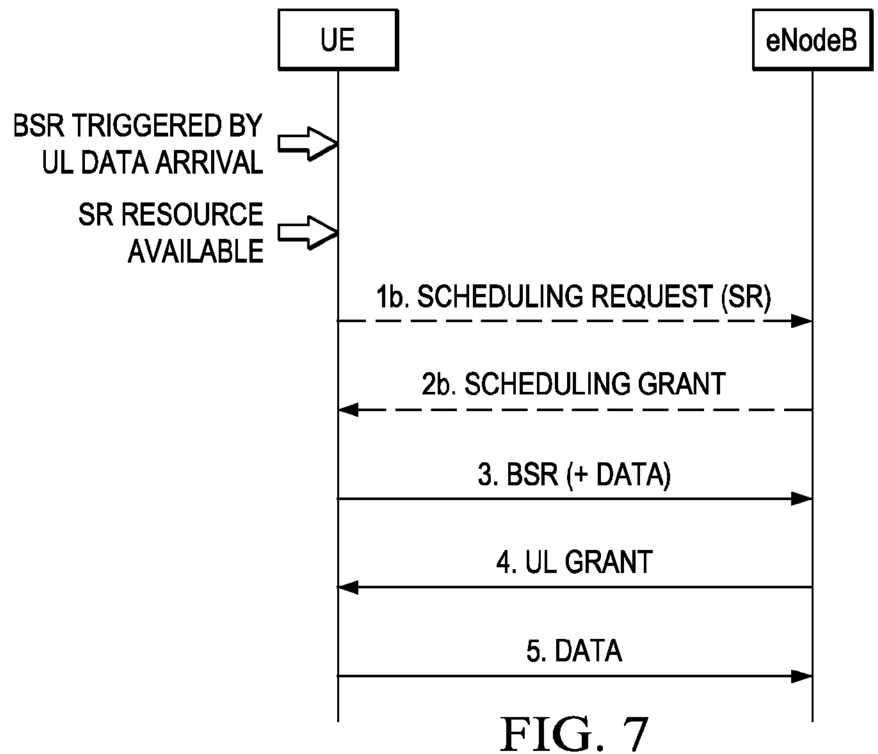
FIG. 7 illustrates an example of a buffer status reporting procedure when a UE is in 'synchronized' state and has SR opportunity but no UL grant.

FIG. 7 shows another example of a buffer status reporting procedure, when the UE is in 'synchronized' state and has SR opportunity but no UL grant. After the BSR is triggered by UL data arrival and a SR resource becomes available, the UE can sends a SR to the eNB as shown in step 1*b*. In return, at step 2*b*, the UE receives a scheduling grant from the eNB. The subsequent steps 3, 4 and 5 are similar to the example above. The steps 1 and 2 are part of a SR procedure, and are used when the synchronized UE has PUCCH resources for SR but no configured UL grant.

In different implementations, the steps above may be slightly different, e.g., depending on factors such as radio resource control (RRC) configuration and/or resource availability. While steps 3, 4 and 5 generally are always executed, the steps 1*a*, 2*a*, 1*b*, and 2*b* may be avoided or minimized under certain configurations/scenarios. For example, UL data arrival during RRC_CONNECTED requires a random access procedure when UL synchronisation status is non-synchronised, or there are no PUCCH resources for SR available. Synchronized UEs may or may not have a dedicated SR channel. PUCCH resources for SR are lost when the UE is no longer synchronized. The SR is used for requesting UL-shared channel (UL-SCH) resources for new transmission. If the serving node is aware of UE's need of transmitting BSR and/or data before UE initiates any RACH procedure or SR procedure, the serving node may assign UL grant or dedicated preamble to the UE accordingly to avoid the need of RACH procedure and/or SR procedure.

The existing BSR procedure is capable of reporting the buffer status of UL data destined to one node only, e.g., the serving eNB in LTE. The BSR is transmitted in the UL grant from the serving eNB only, and the content of the BSR accounts for those UL data which are to be transmitted in the UL grant from the same serving eNB only. Under MSA deployment, however, it may be beneficial or necessary to report to one node the buffer status of UL data which may be destined to multiple nodes. This cross-node buffer status reporting may be beneficial under certain scenarios. For instance, it is beneficial for the primary node (e.g., MeNB) to know the UL data that needs to be handled by secondary nodes (e.g., SeNBs) potentially, so that UL traffic loads of multiple nodes may be balanced accordingly. The primary node may be informed of the amount of UL data to be handled by a secondary node alone, e.g., through a secondary node specific BSR CE. It is also possible that the primary node may be informed of the amount of UL data that may be handled by either the primary node or the secondary node in aggregation, and then the network (e.g., the primary node) may decide the UL grant allocation to the UE among participating serving nodes. It is also beneficial to allow the UE to transmit the BSRs in the first available UL grant from a MSA node, and require the MSA node to forward in turn one or more BSRs to one or more destination nodes. The BSRs of different nodes may or may not require forwarding between nodes, depending on the configuration and use cases. Embodiments are provided herein for enabling such cross-node buffer status reporting scheme for MSA.

Figure 8:
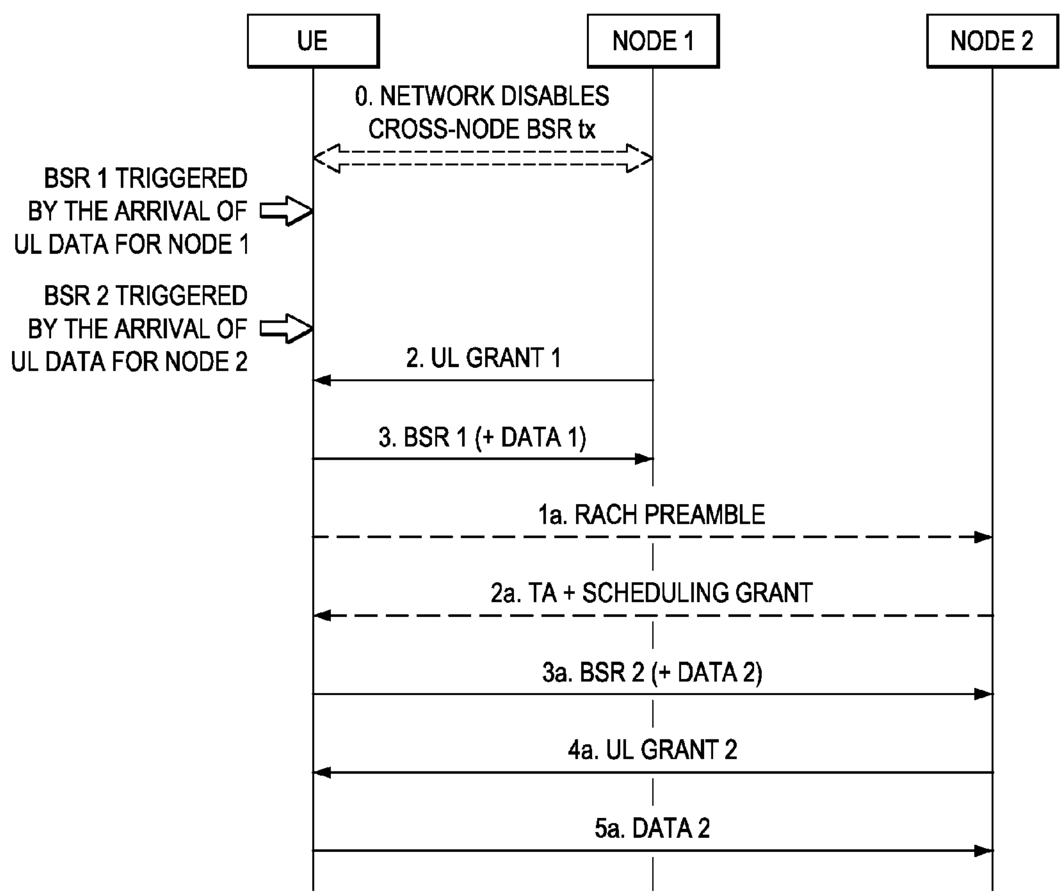
FIG. 8 illustrates an embodiment of a buffer status reporting procedure in which cross-node BSR transmission is disabled when a UE is in 'non-synchronized' state or there is no SR opportunity for the UE, assuming no collision occurs during the RACH procedure.

FIG. 8 shows an embodiment of a buffer status reporting procedure in which cross-node BSR transmission is disabled), when the UE is in 'non-synchronized' state or there is no SR opportunity (assuming no collision occurs during RACH procedure). At step 0, the cross-node BSR transmission is disabled at the UE according to the network configuration sent by a first node (node 1). Due to the arrival of UL data for node 1 and node 2, a first BSR (BSR 1 destined to node 1) and a second BSR (BSR 2 destined to node 2) are triggered to be transmitted to node 1 and node 2 respectively. At step 2, a first UL grant (UL grant 1) is received at the UE from node 1. At step 3, the first BSR (BSR 1) is sent from the UE to node, and maybe data 1 if there is any resources available in the MAC PDU after including the BSR 1. At step 1*a*, a RACH preamble is sent from the UE to second node (node 2). In return, at step 2*a*, a TA and scheduling grant is received from node 2. The steps 1*a* and 2*a* can be performed independently from (e.g., after, during, or before) the steps 2 and 3. At step 3*a*, the UE sends the second BSR (BSR 2) to node 2, and maybe data 2 if there is any resources available in the MAC PDU after including the BSR 2. In return, at step 4*a*, the UE receives a second grant (grant 2) from node 2. At step 5*a*, the UE sends second data (data 2) to node 2.

Figure 9:
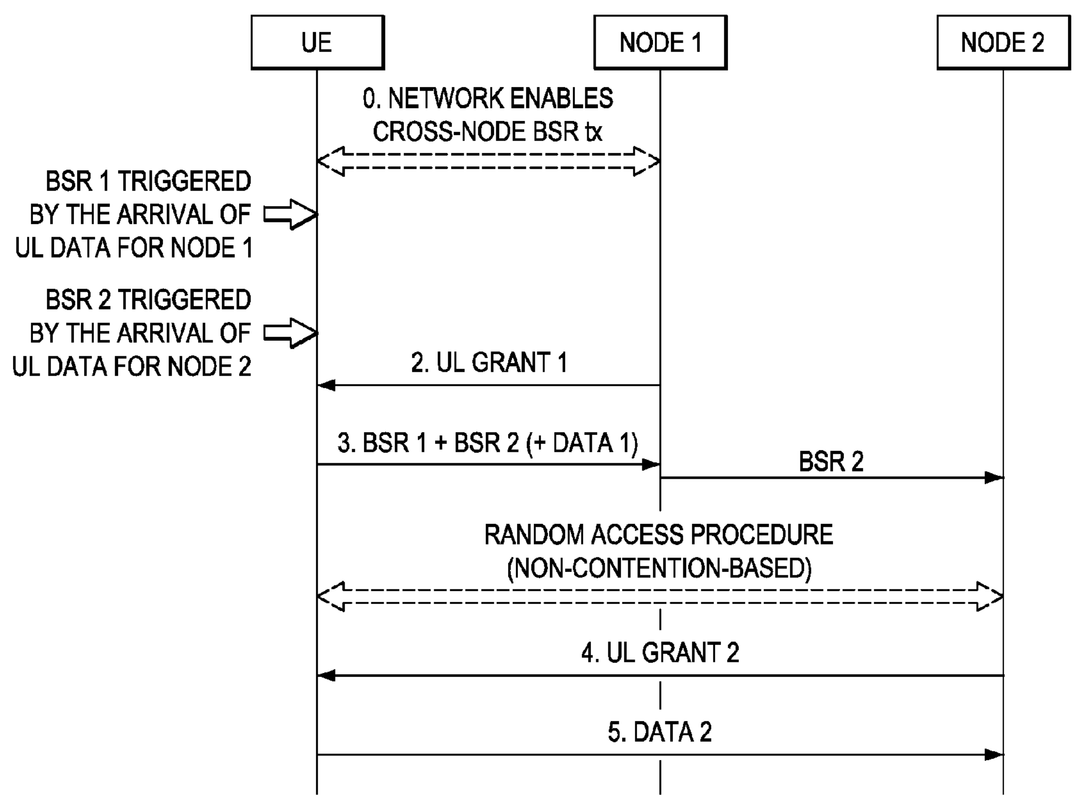
FIG. 9 illustrates an embodiment of a buffer status reporting procedure in which cross-node BSR transmission is enabled when a UE is in 'non-synchronized' state or there is no SR opportunity for the UE, assuming no collision occurs during the RACH procedure.

FIG. 9 shows an embodiment of a buffer status reporting procedure in which cross-node BSR transmission is enabled, when the UE is 'non-synchronized' or there is no SR opportunity. When the transmission of the buffer status of UL data destined for multiple nodes towards one node is allowed, the buffer status of UL data towards either node 1 or node 2 may be sent to one of the nodes, e.g., to the node from which the UL grant becomes available first, that is, node 1 in FIG. 9 because the UL grant from node 1 becomes available first. At step 0, the cross-node buffer status reporting is enabled at the UE according to the network configuration sent by a first node (e.g., node 1). Due to the arrival of UL data for node 1 and node 2, a first BSR (BSR 1 destined to node 1) and a second BSR (BSR 2 destined to node 2) are triggered to be transmitted to node 1 and node 2 respectively. At step 2, UL grant 1 from node 1 becomes available first. At step 3, BSR1 and BSR2 for node 1 and node 2, respectively, are both sent to node 1, and maybe data 1 if there is any resources available in the MAC PDU after including the BSR 1 and BSR 2. Upon reception of both BSR1 and BSR2, node 1 forwards BSR2 to the corresponding node 2 over the backhaul if it is configured to do so. Once BSR2 is processed by node 2, node 2 initiates a non-contention based RACH procedure to synchronize with the UE and provide UL grant for further data transmission. At step 4, the UE receives UL grant 2 from node 2. At step 5, the UE sends data 2 to node 2. In this example procedure, the delay of reporting buffer status to the destination node may be minimized by avoiding the contention-based RACH procedure to the destination node, if the backhaul latency is small and cross-node BSR transmission is enabled. However, if the backhaul latency is large, disabling cross-node BSR transmission may be preferred.

Figure 10:
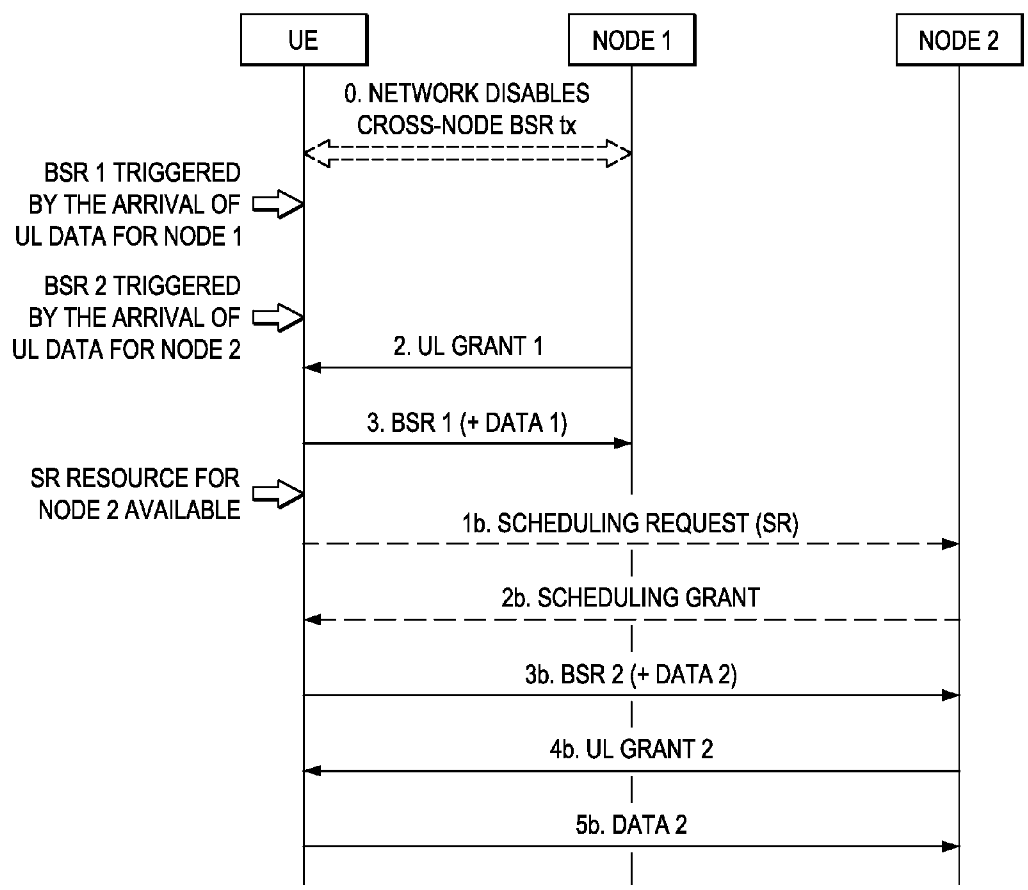
FIG. 10 illustrates an embodiment of a buffer status reporting procedure in which cross-node BSR transmission is disabled when a UE is in 'synchronized' state and has SR opportunity but no UL grant.

FIG. 10 shows an embodiment of a buffer status reporting procedure in which cross-node BSR transmission is disabled, when the UE is 'synchronized' and has SR opportunity but no UL grant. At step 0, the cross-node BSR transmission is disabled at the UE according to the network configuration sent by a first node (node 1). Due to the arrival of UL data for node 1 and node 2, a first BSR (BSR 1 destined to node 1) and a second BSR (BSR 2 destined to node 2) are triggered to be transmitted to node 1 and node 2 respectively. At step 2, a UL grant 1 is received at the UE from node 1. At step 3, BSR 1 is sent from the UE to node 1, and maybe data 1 if there is any resources available in the MAC PDU after including the BSR 1. After SR resource for node 2 becomes available, a SR is sent from the UE to node 2 at step 1*b*. In return, at step 2*b*, a scheduling grant is received from node 2. The steps 1*b* and 2*b* can be performed independently from (e.g., after, during, or before) the steps 2 and 3. At step 3*b*, the UE sends the BSR 2 to node 2, and maybe data 2 if there is any resources available in the MAC PDU after including the BSR 2. In return, at step 4*b*, the UE receives an UL grant 2 from node 2. At step 5*b*, the UE sends data 2 to node 2.

Figure 11:
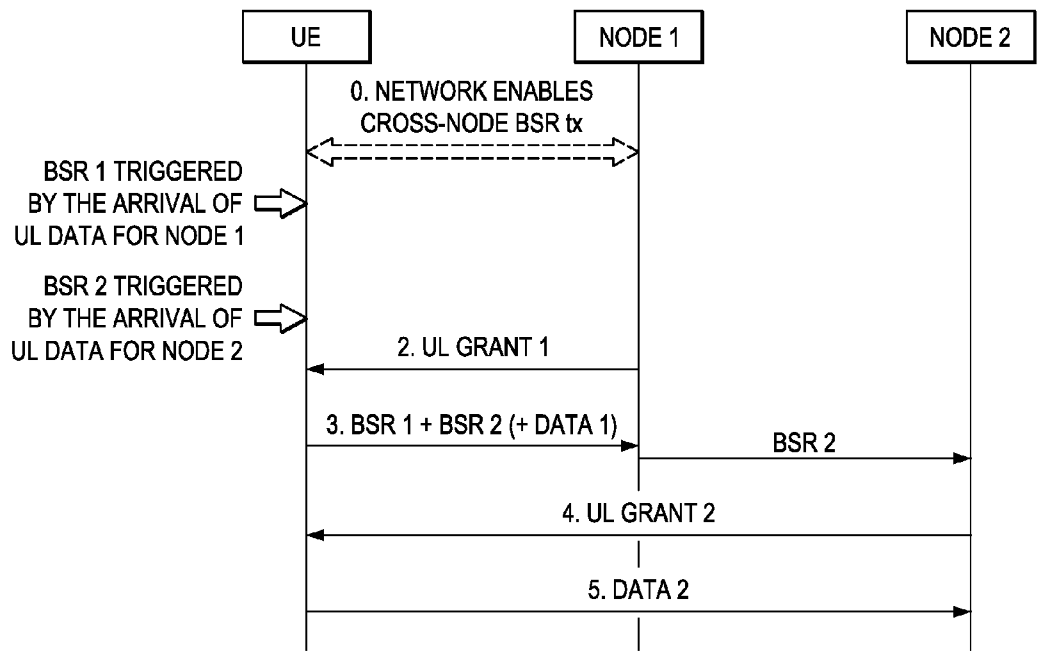
FIG. 11 illustrates an embodiment of a buffer status reporting procedure in which cross-node BSR transmission is enabled when a UE is in 'synchronized' state and has SR opportunity but no UL grant.

FIG. 11 shows an embodiment of a buffer status reporting procedure in which cross-node BSR transmission is enabled, when the UE is 'synchronized' and has SR opportunity but no UL grant. When the transmission of the buffer status of UL data destined for multiple nodes towards one node is allowed, the buffer status of UL data towards either node 1 or node 2 may be sent to one of the nodes, e.g., to the node from which the UL grant becomes available first, that is, node 1 in FIG. 11 because the UL grant from node 1 becomes available first. At step 0, the cross-node buffer status reporting is enabled at the UE according to the network configuration sent by a first node (e.g., node 1). Due to the arrival of UL data for node 1 and node 2, a first BSR (BSR 1 destined to node 1) and a second BSR (BSR 2 destined to node 2) are triggered to be transmitted to node 1 and node 2 respectively. At step 2, UL grant 1 from node 1 becomes available first. At step 3, BSR1 and BSR2 for node 1 and node 2, respectively, are both sent to node 1, and maybe data 1 if there is any resources available in the MAC PDU after including the BSR 1 and BSR 2. Upon reception of both BSR1 and BSR2, node 1 forwards BSR2 to the corresponding node 2 over the backhaul if it is configured to do so. Once BSR2 is processed by node 2, node 2 allocates an UL grant to UE for further data transmission directly without going through the SR procedure with the UE. At step 4, the UE receives UL grant 2 from node 2. At step 5, the UE sends data 2 to node 2. In this example procedure, the delay of reporting buffer status to the destination node may be minimized by avoiding the SR procedure between the UE and node 2, if the backhaul latency is small and cross-node BSR transmission is enabled. However, if the backhaul latency is large, disabling cross-node BSR transmission may be preferred.

Under Hetnet/small cell deployment scenarios, it is possible that one cell exchanges data more frequently with the UE than another cell, and thus there is more opportunity to piggyback BSRs. For example, under a Macro-Pico control plane (CP)/user plane (UP) scenario, the macro handles CP data which is more time sensitive, while the pico handles UP data and interacts more frequently with the UE. In such or similar scenarios, the UE's capability of cross-node buffer status reporting is supported. Accordingly, a UE is allowed to report to a second node the buffer status related to UL data that may be received by a first node, e.g., in an UL grant from the second node. A UE is further allowed to transmit BSRs of multiple nodes in one transmission time interval (TTI)/MAC PDU. The UE may decide when and/or whether to transmit cross-node BSR considering various factors, such as network configuration (e.g., enabled versus disabled, 'synchronized' versus 'non-synchronized'), UE's own information (e.g., whether an SR will become available soon, 'synchronized' versus 'non-synchronized'), or a combination of both network and UE information. The network's configuration of the UE's cross-node buffer status reporting function may take into account the backhaul latency and/or the processing capability of related nodes. The network's configuration can be conveyed to the UE through RRC messages. In addition, the UE may decide to transmit BSRs of multiple nodes in the first available UL grant, or in a selected UL grant that meets certain criteria, e.g., the grant from a macro eNB.

Further, the network may decide whether the receiving node (e.g., the node which receives BSRs from the UE directly over the air interface) to forward a BSR to the corresponding destination node (e.g., the node whose UL buffer content of the BSR is associated with) based on the UE's request or the network's preference. For example, a first node (node 1) is the receiving node and a second node (node 2) is the corresponding node. The UE may indicate in the BSR(s) to node 1 whether node 1 is required to forward BSR2 to node 2, or may keep the BSR(s) for its own information. The network or the UE may configure/request the need of BSR forwarding using a special value for a flag byte in a BSR MAC CE, or through other means, such as RRC messages or other MAC CE. In another example, upon receiving BSR2 of node 2, the network controller or node 1 may examine current UL/DL traffic load of node 2, and reconfigure/rebalance the traffic load between node 1 and node 2 if necessary. Depending on the reconfiguration outcome, BSR2 may or may not need to be forwarded to node 2 in its original content.

For the illustration purpose and simplicity of description, symbols BSR 1 and BSR 2 are used in FIGS. 8, 9, 10 and 11 and the corresponding discussion above. However, the interpretation of BSR 1 or BSR 2 shall not be restricted to the 3GPP LTE specific MAC BSR CE format and content only. BSR 2 may be interpreted as the amount of UL data that may be transmitted to node 2 in the future. The amount may be reported in the format of the current MAC BSR CE, or it may also be reported in new BSR format as discussed in following Figures and paragraphs. In addition, the amount of UL data that may be transmitted to node 2 in the future may be reported separately, or it may be reported in aggregation with the amount of UL data that may be transmitted to node 1 (and/or other nodes participated in MSA for the same UE) in the future. The aggregation reporting may be necessary because throughput enhancement is one of the major motivations for MSA deployment. In the downlink direction, it is allowed under MSA architecture to transmit the data of the same EPS bearer to a UE through multiple nodes. Similarly, in the UL direction, it is also possible that the network may allocate UL grants from multiple nodes to the UE and aggregate the receive data at the network side. The UE may transmit UL data in the earliest available UL grants and is not restricted to a particular node, such that the delay may be minimized. Consequently, when the UE reports its amount of UL data to be transmitted, it might not know or need to specify in advance from which node the UL grant has to be assigned. An aggregate amount of pending UL data to be transmitted is enough for the network to know the need of radio resources and to coordinate among MSA nodes accordingly.

If the BSR of a second node (e.g., node 2) is to be reported to a first node (e.g., node 1), a new MAC CE format can be used to support the reporting of multiple nodes' buffer status to one node. For example, an extended BSR MAC CE or a general extended format MAC CE may be defined, as described below. New messages, e.g., X2 messages, may also be designed to forward BSRs from the receiving node to the corresponding destination node. An implementation-specific interface and/or message(s), or S1 messages, can also be used.

When using a MAC CE format to support the reporting of multiple nodes' buffer status to one node, one or more node ID(s) can be used to signal corresponding BSR(s) explicitly. However, this may cause larger overhead due to the node ID field. Further, there may be no support for flexible BSR type or forwarding behavior in the system. Alternatively, instead of using a node ID, long BSRs of all nodes can be included in one CE. This may cause larger overhead due to the long BSR formats and signaling all nodes' BSRs regardless of the triggering node. Further, the system may not support flexible BSR type or forwarding behavior.

In an embodiment to allow cross-node BSR transmission, the UE may transmit BSR(s) in an UL grant towards a node other than the final destination node of the BSR. The UE may transmit BSRs of multiple nodes in one TTI/MAC PDU. The receiving node forwards the BSR(s) to the destination node(s), if necessary or enabled. The network may configure, enable, or disable a UE's capability of cross-node BSR transmission, according to network's knowledge, such as the backhaul latency between corresponding nodes. The UE may also decide whether to transmit a BSR cross-node, according to the UE's knowledge, such as the configuration or instructions from the network, or a trigger for cross-node BSR transmission (e.g., pending SR opportunity, UE non-synchronized).

Figure 12:
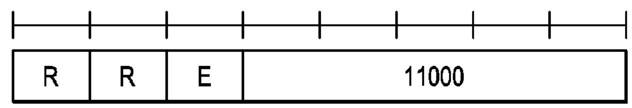
FIG. 12 illustrates an embodiment of a subheader for an extended BSR CE.
Figure 13:
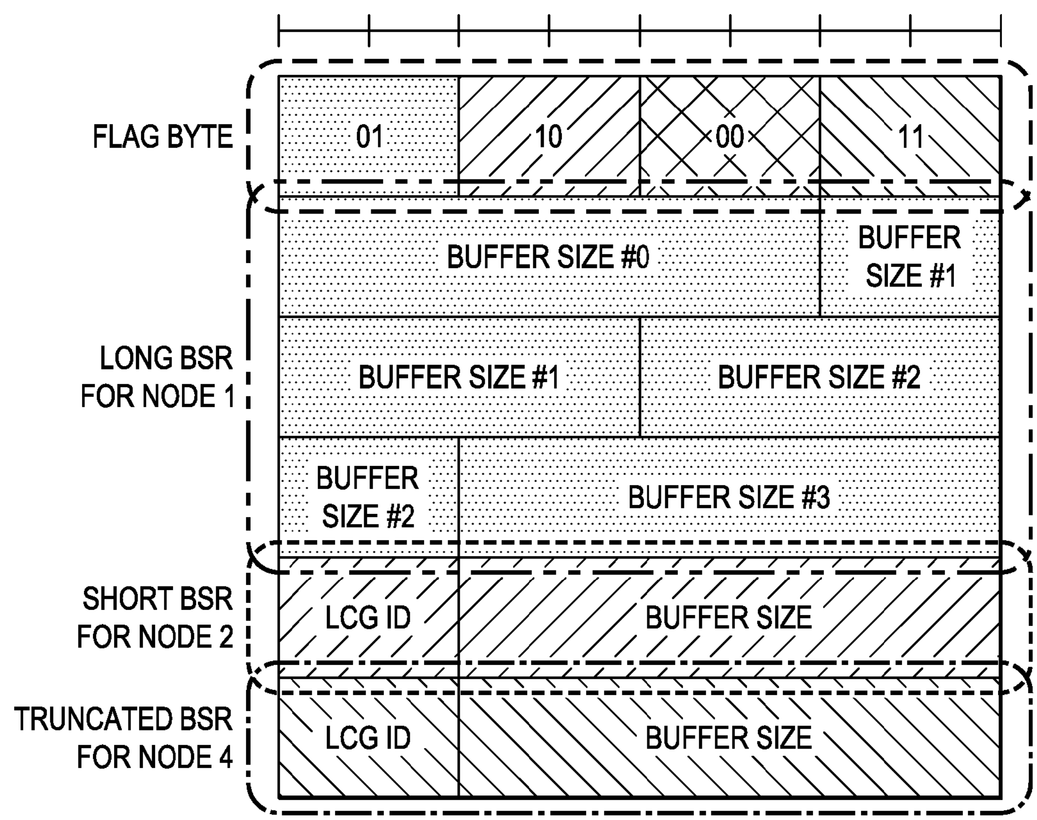
FIG. 13 illustrates an embodiment of payload for an extended BSR CE.

FIG. 12 shows an embodiment of a subheader for an extended BSR CE in a MAC PDU. Specifically, an LCID is defined to indicate that the subheader is for an extended BSR. For example, the LCID is set to 11000. FIG. 13 shows an embodiment of payload for the extended BSR CE. In the payload, the first byte (or the first few bytes) is used as the flag byte(s) to indicate which node's buffer status is reported and/or the corresponding BSR format (e.g., long, short, truncated). For example, two bits in the flag byte for each MSA node are configured by RRC signaling to be 00 if BSR is not included, 01 for long BSR, 10 for short BSR, and 11 for truncated BSR. The receiving node forwards BSR(s) to corresponding node(s) unless the flag byte(s) is the reserved value of "all 0s". The location of the flag byte may be in other places within the MAC PDU and may be of non-integer number of bytes.

Figure 14:
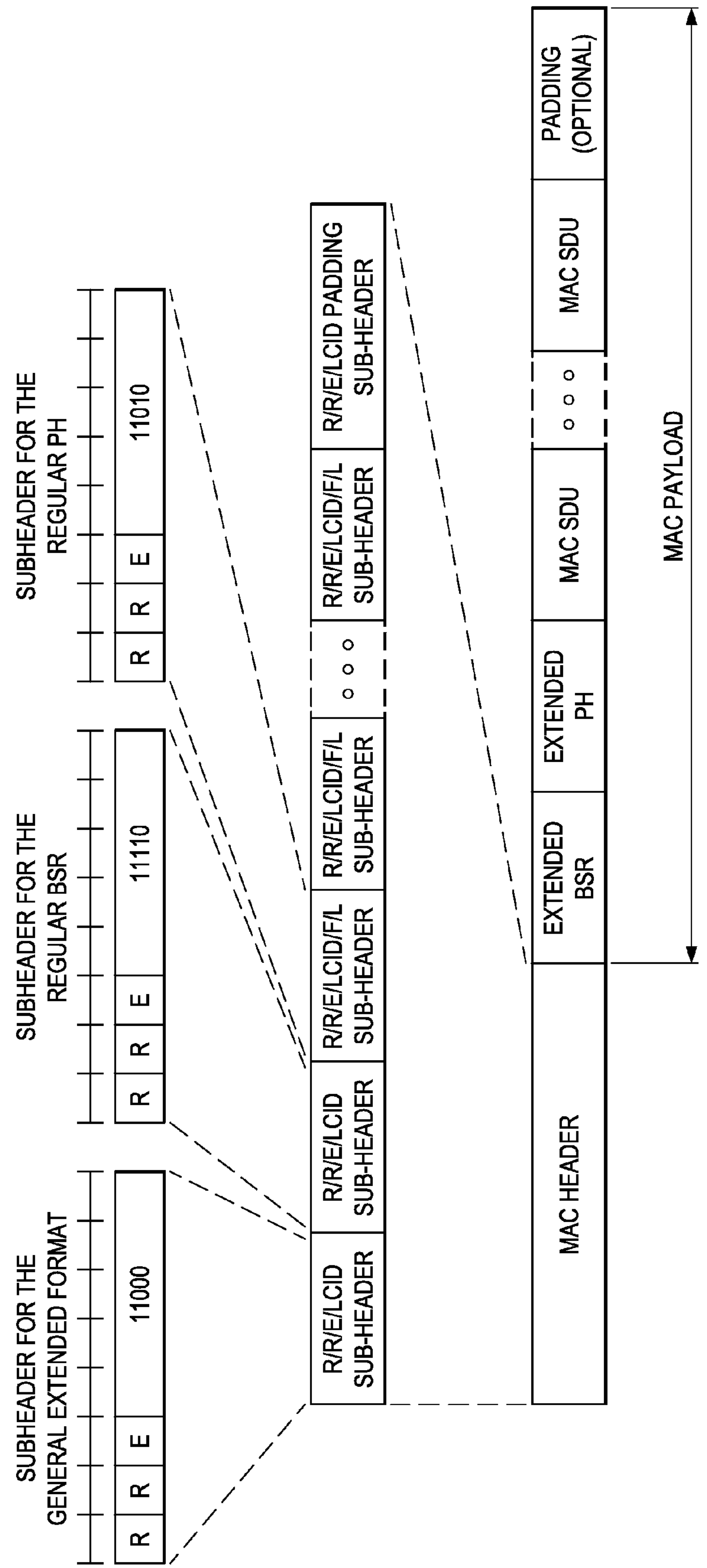
FIG. 14 illustrates an embodiment of a MAC PDU with a MAC CE for a general extended format.

FIG. 14 shows an embodiment of a MAC PDU with a MAC CE for a general extended format. In one example, when the general extended format MAC CE subheader is included in the MAC header, it indicates that all MAC CE subheaders which are listed afterwards shall be interpreted as the extended format of the corresponding CE wherever applicable, such as an extended power headroom (PH), an extended BSR, an extended timing advance command (TAC), extended activation/deactivation, and the like. The general extended format MAC CE has an empty payload. The subheader for the general extended format may use a predefined LCID, e.g., the LCID set to 11000. The subheader for other MAC CEs for which the extended format applies may reuse a current MAC CE header for non-extended format. For example, the LCID for the extended BSR may reuse current LCIDs for BSRs (long, short or truncated), or may use a new value. The payload and BSR forwarding may be implemented as described in the embodiment procedures above. In another example, when the general extended format MAC CE subheader is included in the MAC header, it indicates that all MAC CE subheaders in the MAC header shall be interpreted as the extended format of the corresponding CE wherever applicable.

In an embodiment, different LCIDs are used in the BSR CE subheader to differentiate nodes. However, the maximum number of nodes that can be supported generally is limited by the availability of reserved LCIDs. For example, as of now there are 14 reserved LCID values for UL, thus four additional nodes at most if there are three BSR LCIDs per node. Each node may inform the UE of the BSR LCIDs to be used through RRC signaling or MAC CEs. The LCID values used for each node can be consecutive or non-consecutive, for example.

In another embodiment, different LCGs can be used to differentiate nodes. If LCGs of different nodes are non-overlapping, one regular BSR can be used to report buffer status for multiple nodes. The LCG ID field can comprise two bits, and the LCG can be organized based on quality of service (QoS) priority. In this case, generally the maximum number of nodes that can be reported is four. In another embodiment, a node ID can be added explicitly for the corresponding BSR. The number of bits for the node ID field is chosen properly considering that the payload of MAC CE is byte-aligned. In this case, the overhead associated with node ID may not be trivial.

In an embodiment, the BSR forwarding behavior is specified/signaled separately if the forwarding request generally cannot be conveyed by the BSR MAC CE itself. For example, the receiving node forwards BSRs to corresponding nodes unless instructed otherwise by RRC signaling or other MAC CEs. Other embodiments or variations of the above embodiments are also possible. For example, in an embodiment, a flag byte is used only to indicate which node's buffer status is reported, but not the corresponding BSR format (long, short, truncated). In this case, the BSRs included may be of the same format, e.g., all long BSRs.

Figure 15:
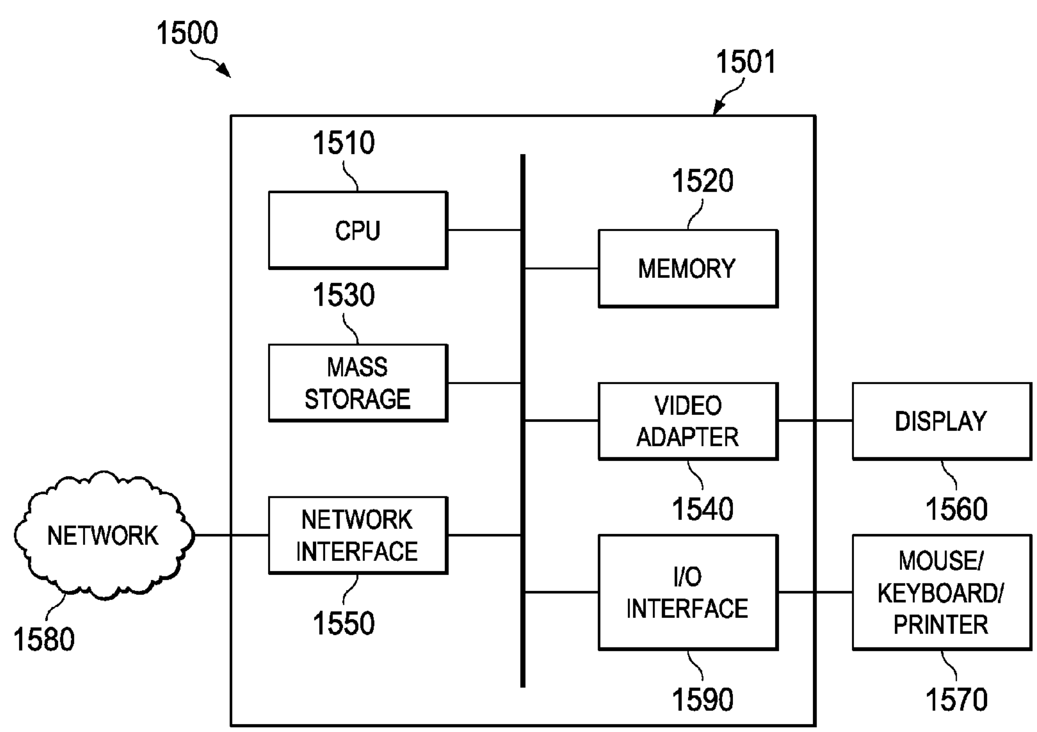
FIG. 15 is a block diagram of a mobile communications device that can be used to implement various embodiments; and Corresponding numerals and symbols in the different figures generally refer to corresponding parts unless otherwise indicated. The figures are drawn to clearly illustrate the relevant aspects of the embodiments and are not necessarily drawn to scale.

FIG. 15 is a block diagram of a processing system 1500 that may be used for implementing the devices and methods disclosed herein, such as an eNB or other network node. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1500 may comprise a processing unit 1501 equipped with one or more input/output devices, such as a speaker, microphone, mouse, touchscreen, keypad, keyboard, printer, display, and the like. The processing unit 1501 may include a central processing unit (CPU) 1510, memory 1520, a mass storage device 1530, a video adapter 1540, and an I/O interface 1590 connected to a bus.

The bus may be one or more of any type of several bus architectures including a memory bus or memory controller, a peripheral bus, video bus, or the like. The CPU 1510 may comprise any type of electronic data processor. The memory 1520 may comprise any type of system memory such as static random access memory (SRAM), dynamic random access memory (DRAM), synchronous DRAM (SDRAM), read-only memory (ROM), a combination thereof, or the like. In an embodiment, the memory 1520 may include ROM for use at boot-up, and DRAM for program and data storage for use while executing programs.

The mass storage device 1530 may comprise any type of storage device configured to store data, programs, and other information and to make the data, programs, and other information accessible via the bus. The mass storage device 1530 may comprise, for example, one or more of a solid state drive, hard disk drive, a magnetic disk drive, an optical disk drive, or the like.

The video adapter 1540 and the I/O interface 1590 provide interfaces to couple external input and output devices to the processing unit 1501. As illustrated, examples of input and output devices include a display 1560 coupled to the video adapter 1540 and a combination of mouse/keyboard/printer 1570 coupled to the I/O interface 1590. Other devices may be coupled to the processing unit 1501, and additional or fewer interface cards may be utilized. For example, a serial interface such as Universal Serial Bus (USB) (not shown) may be used to provide an interface for a printer.

The processing unit 1501 also includes one or more network interfaces 1550, which may comprise wired links, such as an Ethernet cable or the like, and/or wireless links to access nodes or one or more networks 1580. The network interface 1550 allows the processing unit 1501 to communicate with remote units via the networks 1580. For example, the network interface 1550 may provide wireless communication via one or more transmitters/transmit antennas and one or more receivers/receive antennas. In an embodiment, the processing unit 1501 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:

receiving from a network, by a user equipment (UE), a configuration regarding enabling cross-node buffer status reporting;

receiving, by the UE, in the first uplink allocation to the first network node, a media access control (MAC) protocol data unit (PDU) comprising a MAC control element (CE) including the buffer status intended for the second network node and at least one of a first indicator of a presence of the buffer status, a second indicator of a type of the buffer status, a third indicator of a length of the buffer status, or a fourth indicator to the first network node for forwarding the buffer status to the second network node.

2. The method of claim 1, wherein the buffer status intended for the second network node includes amount information of a portion or an amount of uplink (UL) data to be transmitted to one of the first network node or the second network node.

3. The method of claim 1, wherein the configuration is received by the UE in at least one radio resource control (RRC) message.

4. The method of claim 1 further comprising:

receiving, from the network, a configuration regarding disabling cross-node buffer status reporting;

receiving a second uplink allocation from the second network node; and transmitting the buffer status in the second uplink allocation to the second network node.

5. The method of claim 1, wherein the MAC CE includes an extended buffer status report (BSR) CE subheader, and an extended BSR CE payload comprising the buffer status.

6. The method of claim 1, wherein the at least one of the first indicator, the second indicator, the third indicator, or the fourth indicator is presented in the MAC CE in a format of at least one flag byte.

7. The method of claim 5, wherein a predefined logical channel identifier (LCID) value indicates that a subheader of the MAC CE is the extended BSR CE subheader.

8. The method of claim 1, wherein the MAC PDU includes a general extended format CE subheader, a regular buffer status report (BSR) CE subheader and an extended format BSR CE payload comprising the buffer status, wherein the general extended format CE subheader indicates that a payload of at least one regular MAC CE is in extended format.

9. The method of claim 8, wherein the at least one regular MAC CE includes at least one of a power headroom, a BSR, a timing advance command, or activation-deactivation.

10. The method of claim 8, wherein a predefined logical channel identifier (LCID) value indicates that a subheader in the MAC PDU is the general extended format CE subheader.

11. The method of claim 4, wherein the configuration regarding one of enabling or disabling cross-node buffer status reporting is triggered by at least one of a plurality of network nodes participating in MSA according to knowledge including backhaul latency between the first network node and the second network node.

12. The method of claim 4, wherein the configuration regarding one of enabling or disabling buffer status reporting is triggered by the UE according to UE configuration.

13. A method comprising:

receiving, by a first network node, a configuration regarding cross-buffer status reporting from the first network node to a second network node;

receiving, by the first network node from a user equipment (UE), a MAC protocol data unit (PDU) comprising a media access control (MAC) control element (CE) including a buffer status intended for a second network node and at least one of a first indicator of a presence of the buffer status, a second indicator of a type of the buffer status, a third indicator of a length of the buffer status, or a fourth indicator to the first network node for forwarding the buffer status to the second network node, wherein cross-node buffer status reporting is enabled at the UE; and determining, by the first network node, whether to forward the buffer status to the second network node according to the configuration regarding cross-buffer status reporting.

14. The method of claim 13, wherein cross-node buffer status reporting is enabled at the UE by one of the first network node, the second network node, or a third network node.

15. The method of claim 13, wherein the configuration regarding cross-buffer status reporting is received from one of the second network node or a third network node.

16. The method of claim 13, wherein the configuration regarding cross-buffer status reporting is received from the UE.

17. The method of claim 16, wherein the configuration regarding cross-buffer status reporting is received in at least one indicator in the MAC PDU comprising the buffer status.

18. The method of claim 13, further comprising forwarding the buffer status to the second network node in a X2 message.

19. The method of claim 13, further comprising:

aggregating the buffer status with other information intended for the second network node; and forwarding the aggregated buffer status and other information in a X2 message.

20. A user equipment (UE) comprising:

at least one processor located in the UE; and a non-transitory computer readable storage medium located in the UE storing programming for execution by the at least one processor, the programming including instructions to:

receive, from a network, a configuration regarding enabling cross-node buffer status reporting transmission;

receive a first uplink allocation from a first network node;

obtain a buffer status intended for a second network node; and transmit, in the first uplink allocation to the first network node, a media access control (MAC) protocol data unit (PDU) comprising a MAC control element (CE) including the buffer status intended for the second network node and at least one of a first indicator of a presence of the buffer status, a second indicator of a type of the buffer status, a third indicator of a length of the buffer status, or a fourth indicator to the first network node for forwarding the buffer status to the second network node.

21. The UE of claim 20, wherein the programming includes further instructions to:

receive, from the network, a configuration regarding disabling cross-node buffer status reporting;

receive a second uplink allocation from the second network node; and transmit the buffer status in the second uplink allocation to the second network node.

22. A first network node comprising:

at least one processor located in the first network node; and a non-transitory computer readable storage medium located in the first network node storing programming for execution by the at least one processor, the programming including instructions to:

receive a configuration regarding cross-buffer status reporting from the first network node to a second network node;

receive, from a user equipment (UE), a MAC protocol data unit (PDU) comprising a media access control (MAC) control element (CE) including a buffer status intended for a second network node and at least one of a first indicator of a presence of the buffer status, a second indicator of a type of the buffer status, a third indicator of a length of the buffer status, or a fourth indicator to the first network node for forwarding the buffer status to the second network node, wherein cross-node buffer status reporting is enabled at the UE; and determine whether to forward the buffer status to the second network node according to the configuration regarding cross-buffer status reporting.

23. The first network node of claim 22, wherein the programming includes further instructions to forward the buffer status to the second network node in an X2 message.

24. The first network node of claim 22, wherein the configuration regarding cross-buffer status reporting is received in at least one indicator in the MAC PDU comprising the buffer status.

25. The UE of claim 20, wherein the buffer status intended for the second network node includes amount information of a portion or an amount of uplink (UL) data to be transmitted to one of the first network node or the second network node.

* * * * *